(12) United States Patent
Kuno et al.

(10) Patent No.: US 7,886,030 B2
(45) Date of Patent: Feb. 8, 2011

(54) METHOD TO CONFIGURE A NETWORK DEVICE, SERVICE PROVIDING SYSTEM, SERVICE PROVIDING DEVICE, AND COMPUTER USABLE MEDIUM THEREFOR

(75) Inventors: Takuma Kuno, Aichi (JP); Hideo Ueno, Aichi (JP); Takahiro Hosokawa, Aichi (JP); Masashi Suzuki, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 145 days.

(21) Appl. No.: 11/928,329

(22) Filed: Oct. 30, 2007

(65) Prior Publication Data

US 2008/0104261 A1    May 1, 2008

(30) Foreign Application Priority Data

Oct. 30, 2006 (JP) .............................. 2006-294721

(51) Int. Cl.
G06F 15/177 (2006.01)
(52) U.S. Cl. ........................................ 709/220; 709/221
(58) Field of Classification Search ................ 709/228, 709/220, 221; 370/254
See application file for complete search history.

(56) References Cited

U.S. PATENT DOCUMENTS

| 2005/0025070 | A1 | 2/2005 | Yamada |
| 2005/0278521 | A1 | 12/2005 | Hirai |
| 2006/0002751 | A1 * | 1/2006 | Matsutani .................... 400/62 |

FOREIGN PATENT DOCUMENTS

| JP | 07-311663 | | 11/1995 |
| JP | 10-138465 | A | 5/1998 |
| JP | 2001-014119 | A | 1/2001 |
| JP | 2001014119 | A * | 1/2001 |
| JP | 2001-256154 | | 9/2001 |
| JP | 2001-350604 | A | 12/2001 |
| JP | 2004-013662 | | 1/2004 |
| JP | 2005-004548 | | 1/2005 |
| JP | 2005-039406 | A | 2/2005 |
| JP | 2006-015604 | A | 1/2006 |
| JP | 2006-024199 | | 1/2006 |

OTHER PUBLICATIONS

JP Office Action dtd Oct. 28, 2008, JP Appln. 2006-294721.

* cited by examiner

Primary Examiner—Ario Etienne
Assistant Examiner—Hee Soo Kim
(74) Attorney, Agent, or Firm—Banner & Witcoff, Ltd

(57) ABSTRACT

A method to configure a service providing system having a service providing device and a service requesting device in a network is provided. The method includes steps of obtaining function parameters, which indicate specific values configurable in the service requesting device for receiving the data processing service, when the service requesting device becomes connected to communicate with the service providing device, determining service receiving parameters, which indicate parameters to configure the service requesting device to become receivable of the data processing service, configuring the service receiving device with the service receiving parameters determined in the service receiving parameter determining step, registering the service receiving parameters in association with the service requesting device, and implementing the data processing service for the service requesting device based on the service receiving parameters being associated with the service requesting device, when the service requesting device accesses the service providing device.

13 Claims, 7 Drawing Sheets

| | | CAPABILITIES OF SERVICE PROVIDING DEVICE (INITIAL VALUES) | | |
|---|---|---|---|---|
| | | 150*150 | 200*200 | 300*300 |
| CAPABILITY OF SERVICE REQUESTING DEVICE | CPU FORMAT | A corp. 1GHz | A corp. 2GHz | A corp. 4GHz |
| | | B corp. 0.5GHz | B corp. 1GHz | B corp. 2GHz |

| | | CAPABILITIES OF SERVICE PROVIDING DEVICE (INITIAL VALUES) | | |
|---|---|---|---|---|
| | | 150*150 | 200*200 | 300*300 |
| CAPABILITY OF SERVICE REQUESTING DEVICE | RAM VOLUME | 12MB | 256MB | 512MB |

METHOD TO CONFIGURE A NETWORK DEVICE, SERVICE PROVIDING SYSTEM, SERVICE PROVIDING DEVICE, AND COMPUTER USABLE MEDIUM THEREFOR

CROSS REFERENCE TO RELATED APPLICATION

This application claims priority from Japanese Patent Application No. 2006-294721, filed on Oct. 30, 2006, the entire subject matter of which is incorporated herein by reference.

BACKGROUND

1. Technical Field

Aspects of the present invention relate to a method to configure a service providing device, a service providing system having networking devices being connected to each other through a network for requesting and providing a service, and a service providing device to provide the service.

2. Related Art

Conventionally, functions such as a printing function and a scanning function equipped to a service providing device have been available to a service requesting device, which is connected to the service providing device through a network. In order for such a service requesting device to receive the service from the service providing device, a user is required various operations such as installing a device driver corresponding to the function into the service requesting device and adjusting various settings in the service requesting device.

In recent years, a technique to automatically install a device driver corresponding the service to be provided has been suggested so that the user's operations to receive the service can be simplified. Such a technique is disclosed in Japanese Patent Provisional Publication No. 2006-24199, for example.

With the above technique, however, the user is still required to adjust configuration of the service requesting device after automatically installing the device driver, and procedures for receiving the service are not sufficiently simplified. Thus, inexperienced and/or less-informed users may have been prevented from receiving the service intentionally or unintentionally.

SUMMARY

Aspects of the present invention are advantageous in that a method to configure a service providing device, a service providing system having network devices for receiving and providing a service, and a service providing device are provided so that procedures for receiving the service at a service requesting device and providing the service by a service providing device can be simplified.

According to an aspect of the invention, there is provided a method to configure a service providing system having a service providing device and a service requesting device which are accessibly connected with each other within a network so that the service requesting device can receive a data processing service from the service providing device. The method includes steps of obtaining function parameters, which indicate specific values configurable in the service requesting device for receiving the data processing service, from the service requesting device when the service requesting device becomes connected to communicate with the service providing device, determining service receiving parameters, which indicate parameters to configure the service requesting device to become receivable of the data processing service, configuring the service receiving device with the service receiving parameters determined in the service receiving parameter determining step, registering the service receiving parameters in association with the service requesting device, and implementing the data processing service for the service requesting device based on the service receiving parameters, which are associated with the service requesting device, when the service requesting device accesses the service providing device.

According to another aspect of the invention, there is provided a service providing system. The service providing system includes a service providing device, which is accessibly connected to a network and capable of providing a data processing service to another device within the network, a service requesting device, which is connectable to communicate with the service providing device through the network and capable of accessing the service providing device for the data processing service. The service providing device includes a function parameter obtaining system to obtain function parameters, which indicate specific values configurable in the service requesting device for receiving the data processing service, from the service requesting device when the service requesting device becomes connected to communicate with the service providing device, a parameter determining system to determine service receiving parameters, which indicate parameters to configure the service requesting device to become receivable of the data processing service, a parameter registering system to register the service receiving parameters in association with the service requesting device, and a service implementation system to implement the data processing service for the service requesting device based on the service receiving parameters, which are associated with the service requesting device, when the service requesting device accesses the service providing device.

According to another aspect of the invention, there is provided a service providing device, which is accessibly connected to a network and capable of providing a data processing service to a service requesting device in the network. The service providing device includes a function parameter obtaining system to obtain function parameters, which indicate specific values configurable in the service requesting device for receiving the data processing service, from the service requesting device when the service requesting device becomes connected to communicate with the service providing device, a parameter determining system to determine service receiving parameters, which indicate parameters to configure the service requesting device to be receivable of the data processing service, a parameter registering system to register the service receiving parameters in association with the service requesting device, and a service implementation system to implement the data processing service for the service requesting device based on the service receiving parameters, which are associated with the service requesting device, when the service requesting device accesses the service providing device.

According to another aspect of the invention, there is provided a computer usable medium including computer readable instructions. The computer readable instructions are for configuring a service providing system having a service providing device and a service requesting device which are accessibly connected with each other within a network so that the service requesting device can receive a data processing service from the service providing device, by executing steps of obtaining function parameters, which indicate specific values configurable in the service requesting device for receiving the data processing service, from the service requesting device when the service requesting device becomes connected to communicate with the service providing device, determining service receiving parameters, which indicate parameters to configure the service requesting device to become receivable of the data processing service, configuring the service receiving device with the service receiving parameters determined in the service receiving parameter determining step, registering the service receiving parameters in association with the service requesting device, and implementing the data processing service for the service requesting device based on the service receiving parameters, which are associated with the service requesting device, when the service requesting device accesses the service providing device.

According to the above configurations, the service receiving parameters for the service requesting device are determined based on the function parameters, which include information concerning the service to be received in the service receiving device, and specifications and capabilities of the service receiving device. Therefore, when the service receiving device is configured with such service receiving parameters, and when the data processing service is provided to the service receiving device, the data processing service can be optimized effectively for the specifications and capabilities of the service requesting device.

In the service providing system described above, adjusting the configuration of the service requesting device is not necessary so that user operations for the adjustment can be omitted. Therefore, the data processing service by the service providing device can be provided in less complicated operations, and even users with little experience or information concerning the configuring operations can receive the service easily.

BRIEF DESCRIPTION OF THE ACCOMPANYING DRAWINGS

DETAILED DESCRIPTION

Hereinafter, referring to accompanying drawings, embodiments of the present invention will be described.

Figure 1:
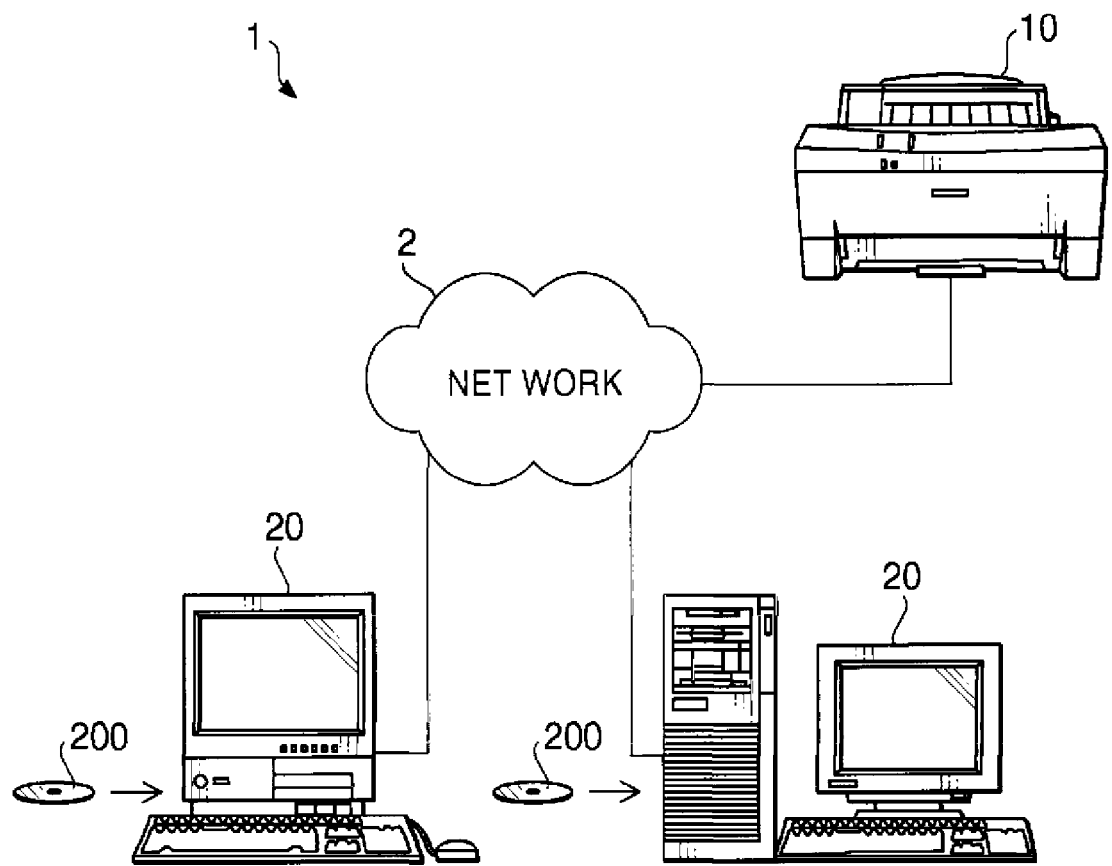
FIG. 1 is a schematic illustration of an entire configuration of a service providing system according to a first embodiment of the present invention.

First of all, an entire configuration of a service providing system according to an embodiment of the present invention will be described. FIG. 1 is a schematic illustration of the entire configuration of the service providing system 1 according to the first embodiment of the present invention.

The service providing system 1 includes a service providing device 10 and a plurality of service requesting device 20. The service providing device 10 The service providing device 10 is equipped with a function to provide a service concerning input and output of information through a network 2 to the service requesting devices 20, which are accessible to the service providing device 10 through the network 2. In the present embodiment hereinafter, the service concerning input and output of information is referred to as an "information I/O service" or a "service."

The service providing device 1 is a networking device such as a printer and a scanner, for example, to provide the information I/O service such as printing and scanning an image to the service requesting device 20 which accesses the service providing device 1.

Figure 2:
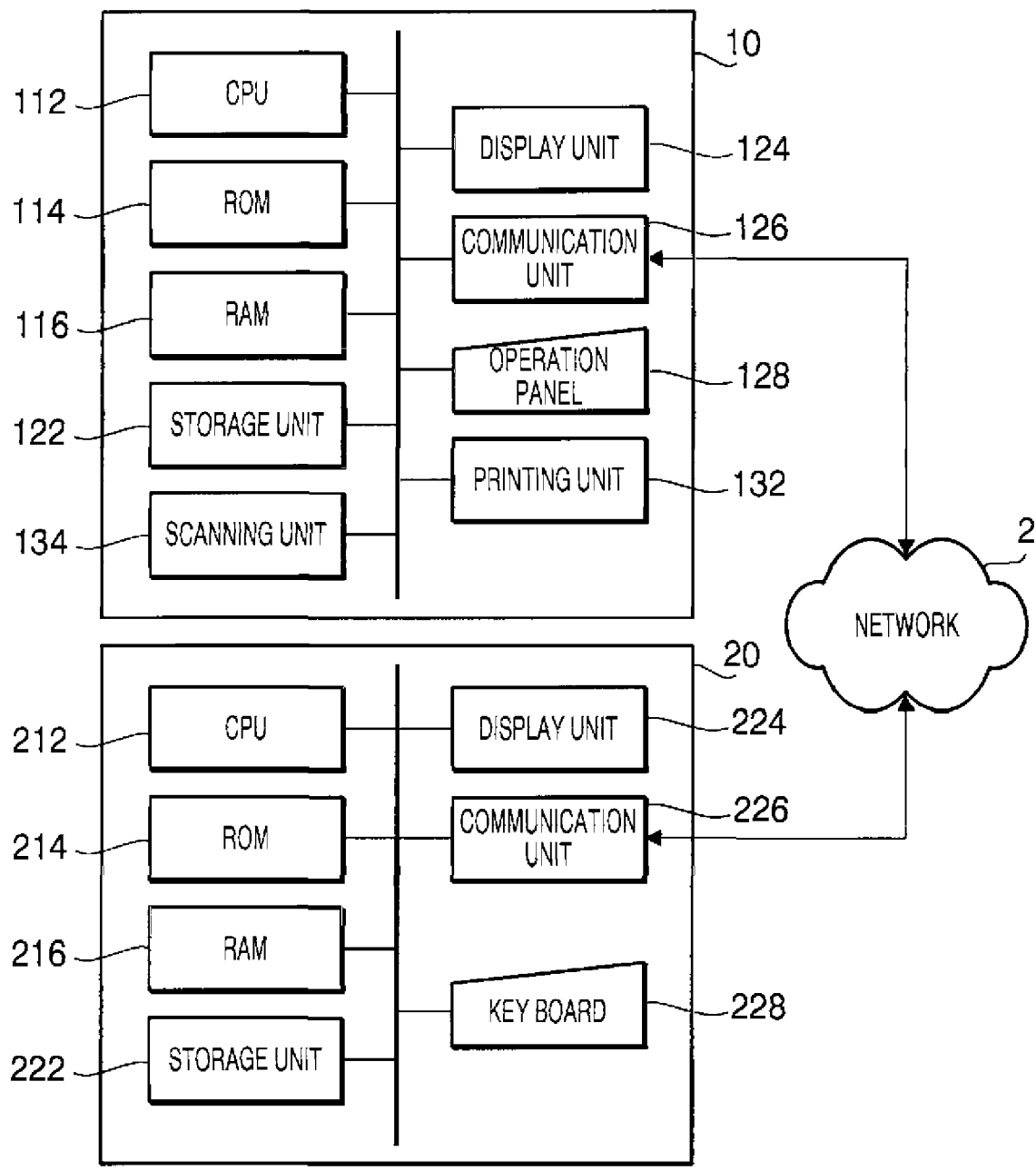
FIG. 2 is a block diagram to illustrate schematic configurations of a service providing device and a service requesting device in the service providing system according to the embodiment of the present invention.

FIG. 2 is a block diagram to illustrate schematic configurations of the service providing device 10 and the service requesting device 20 in the service providing system 1 according to the embodiment of the present invention. As shown in FIG. 2, the service providing device 10 includes a CPU 112, a ROM 114, a RAM 116, a storage unit 122 such as an HDD (hard disk drive), a display unit 124 having a display panel (not shown), a communication unit 126, an operation panel 128, a printing unit 132, and a scanning unit 134. The CPU 112 controls entire operations of the service providing device 10. The ROM 114 stores various data to be used in the service providing device 10. The RAM 116 stores various data for operations executed by the CPU 112. The communication unit 126 controls data communication between the service providing device 10 and an external device, including the service requesting device 20, connected through the network 2. The operation panel 128 includes operation keys and buttons (not shown). The printing unit 132 includes a printing engine (not shown) for printing an image. The scanning unit 134 includes a scanner (not shown) to read an image.

The service requesting device 20 is, for example, a known computer having a CPU 212, a ROM 214, a RAM 216, a storage unit 222 such as an HDD, a display unit 224, a communication unit 226, and a keyboard 228 including various operation keys (not shown). The CPU 212 controls entire operations of the service requesting device 20. The ROM 214 stores various data to be used in the service requesting device 20. The RAM 216 stores various data for operations executed by the CPU 212. The communication unit 226 controls data communication between the service requesting device 20 and an external device, including the service providing device 10, connected through the network 2.

Figure 3:
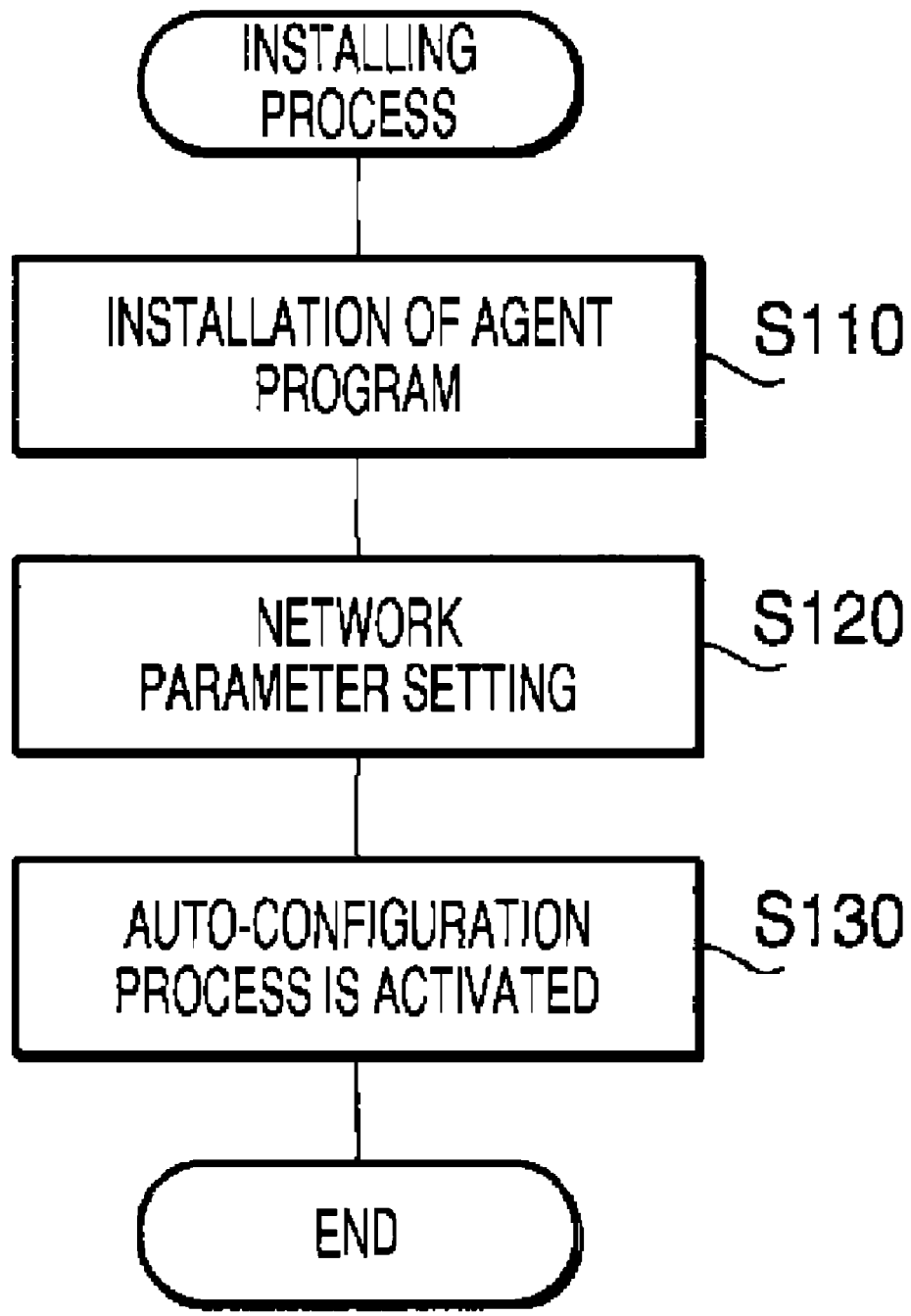
FIG. 3 is a flowchart to illustrate an installing process to be executed by the service requesting device according to the embodiment of the present invention.

Next, an installing process to be executed by the service requesting device 20 will be described. FIG. 3 is a flowchart to illustrate the installing process to be executed by the service requesting device 20 according to the embodiment of the present invention. The installing process is automatically executed by the CPU 212 of the service requesting device 20 when a memory medium 200, in which a predetermined installation program is written, is set in the service requesting device 20. The memory medium 200 having such a program includes a CD-ROM, an FDD (floppy disk drive), and various memory cards, for example. The memory medium 200 is prepared and supplied by a supplier of the service providing device 10 to be used with the service requesting device and bundled with the service providing device 10.

When the installing process is activated, in S110, an agent program is installed. The agent program is a program to activate an auto-configuration process, of which detail is described later.

Next, in S120, parameters for network connection are set in the service requesting device 20. Further, in S130, the agent program installed in S110 activates the auto-configuration process. Thereafter, the installing process terminates.

The agent program is thus installed, and when the agent program is activated, the service requesting device 20 can be suitably configured with service receiving parameters as described below and becomes capable of receiving the service provided by the service providing device 10.

Figures 4A, 4B:
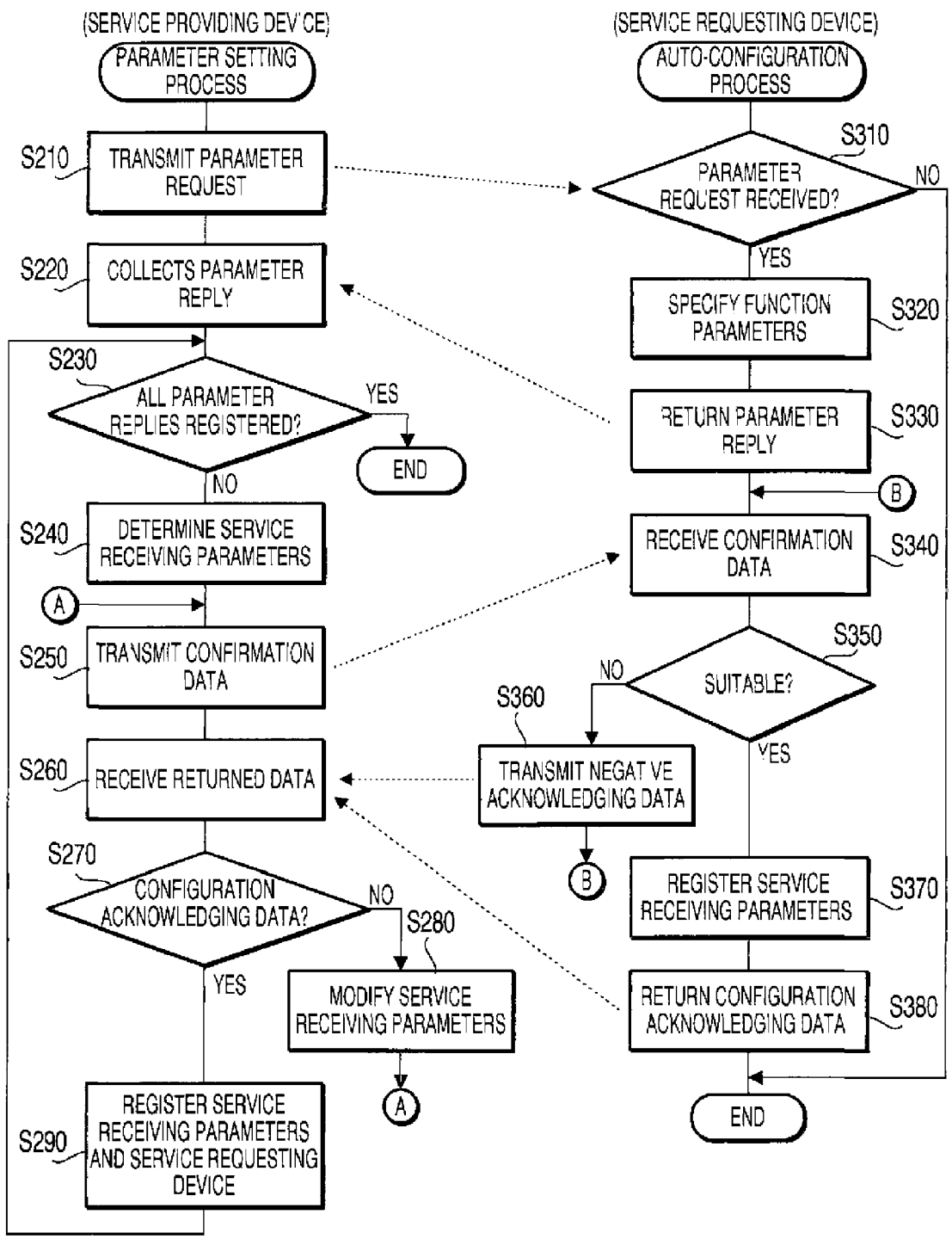
FIGS. 4A and 4B are flowcharts to illustrate processes to be executed by the service providing device and a service requesting device according to the embodiment of the present invention.

Next, a parameter setting process to be executed by the service providing device 10 and the auto-configuration process to be executed by the service requesting device 20 will be described. FIG. 4A is flowcharts to illustrate the parameter setting process to be executed by the CPU 112 of the service providing device 10 according to the embodiment of the present invention. FIG. 4B is the auto-configuration process to be executed by the CPU 212 of the service requesting device 20 according to the embodiment of the present invention. These processes are executed when the service requesting device 20, having been installed the agent program in the installing process (see FIG. 2), requests the service to be provided from the service providing device 10.

Referring to FIG. 4A, the parameter setting process, which is activated repeatedly at a predetermined interval after once the service providing device 10 is activated, will be described. As the parameter setting process is activated, in S210, a parameter request for obtaining function parameters (described later) is transmitted to each service requesting device 20 in the network 2. The transmission of the parameter request is conducted, for example, based on broadcast addresses in a communication environment using Ethernet (registered trademark) and Internet Protocol (IP packets).

The transmission of the parameter request in S210 is a trigger for the parameter setting process and the auto-configuration process to initiate the following steps, which are associated with each other. Therefore, a procedure for transmitting and receiving the parameter request should be previously determined. For example, in the communication environment wherein the Ethernet and IP packets are used, the associated steps in the parameter setting process and the auto-configuration process can be initiated based on events such that the parameter request is broadcasted to the service requesting devices 20, and the service requesting device 20 becomes aware of the transmission.

The function parameters to be obtained by the service providing device 10 are preliminarily prepared parameters concerning the service which can be provided by the service providing device 10 and indicate specific values as parameters configurable in the service requesting device 20 for receiving the service. In the present embodiment, function parameters indicate maximum allowable values and specifications for the service requesting device 20 to receive the service in a most preferable performance. For example, a maximum allowable volume and/or free space of the RAM 216 (e.g., 128 MB, 256 MB, 512 MB, 1 GB) and performance of the CPU 212 (e.g., a model name and an operating frequency) can be included as the function parameters.

In S210, in the present embodiment, an IP packet including an IP address of the sender (i.e., the service providing device 10 itself) and the parameter request is broadcasted to the service requesting devices. The parameter request includes information to identify the service providing device 10, which is referred to as an identifying flag hereinafter, information to indicate a type of the service providing device 10 (model version), and information to indicate a manufacturing number (manufacture's number) of the service providing device 10.

Figures 5, 6A, 6B:
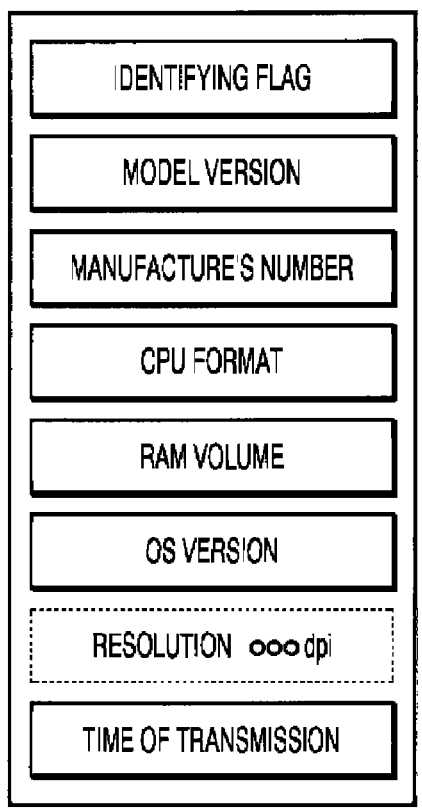
FIG. 5 is a diagram to illustrate a configuration of a parameter reply according to the embodiment of the present invention.
FIGS. 6A and 6B are diagrams to illustrate data structures of configuration tables stored in the service providing device according to the embodiment of the present invention.

Each of the service requesting devices 20 receiving the parameter request returns a parameter reply to the service providing device 10. The parameter reply indicates information to notify corresponding function parameters to the service providing device 10. FIG. 5 is a diagram to illustrate a data structure of the parameter reply according to the embodiment of the present invention. As shown in FIG. 5, the parameter reply includes the identifying flag, the model version, and the manufacture's number of the service providing device 10, which were included in the received parameter request, and time of transmission. Further, information to indicate the performance of the CPU 212 of the service requesting device 20, the maximum space of the RAM 216 (RAM volume), and version information of the operating system (OS version) of the service requesting device 20 are included as the function parameters.

In the present embodiment, in S210, the service providing device 10 appends information indicating the IP address of itself, obtained according to a predetermined protocol such as DHCP (Dynamic Host Configuration Protocol), to the parameter request to broadcast to the service requesting devices 20. It is noted that the communication unit 126 of the service providing device 10 is equipped with a DHCP client function. The service requesting devices 20, which receive the parameter request, can extract the IP address of the service providing device 10 based on the IP address appended to the parameter request.

A DHCP server function, which needs to be provided to one of devices connected to a network, is in many cases provided to a broadband router (not shown) in a SOHO network environment. Therefore, the service providing device 10 in such a network environment obtains the IP address of itself from the DHCP server (i.e., the broadband router) to append to the parameter request prior to broadcasting. It is noted, however, that the IP address of the service providing device 10 is not necessarily appended to the parameter request to be extracted. Instead, the service requesting device 20 can refer to the IP address of the sender, which is included in the IP packet separately from the appended IP address in the parameter request, to identify the service providing device 10.

In the configuration wherein the service requesting device 20 obtains the IP address of the service providing device 10 from the parameter request, the service requesting device 20 can compare the IP address appended to the parameter request with the IP address of the sender included in the IP packet in order to authenticate the service providing device 10. On the other hand, in the configuration wherein the service requesting device obtains the IP address of the service providing device 10 from the IP address of the IP packet, the parameter request can be configured to be smaller in data size, and the authenticating process can be omitted so that the entire process can be performed in shorter time.

After the parameter request is broadcasted in S210, in S220, the service providing device 10 waits for a predetermined period of time to collect IP packets including the parameter replies transmitted from the service requesting devices 20. In this regard, each parameter reply includes an IP address of the service requesting device 20 to identify the sender (i.e., the service requesting device 20). Based on the IP address appended to the parameter reply, the service providing device 10 can identify the sender (i.e., the service requesting device 20). Alternatively, the service providing device 10 can refer to IP addresses of the service requesting devices 20 included in the IP packets separately from the parameter replies in order to identify the service requesting devices 20 as the senders of the parameter replies. Once the IP addresses of the service providing device 10 and the service requesting devices 20 are recognized by each other, the communication therebetween can be executed based on the IP addresses.

Next, in S230, it is judged as to whether all of the function parameters included in the parameter replies, collected in S220, are registered in association with service receiving parameters (described below), which are indicated in a configuration table. In S230, if it is judged that there is a function parameter which is not yet registered in association with the service receiving parameter (S230: NO), in S240, service receiving parameters for the function parameters of the service requesting device 20 are determined with reference to the configuration table.

The configuration table, stored in the storage unit 122 of the service providing device 10, is prepared for each type of the function parameters of the service requesting device 20 and indicates specific values as the parameters allowable to the service requesting device 20 to receive the service in the most preferable performance. In S240, the service receiving parameters are determined based on the specific values indicated in the configuration table. The determined service receiving parameter includes an allowable minimum value, an allowable maximum value, and an average value for the parameters to be set in the service requesting device 20.

FIGS. 6A and 6B are diagrams to illustrate data structures of the configuration tables stored in the service providing device 10 according to the embodiment of the present invention. For example, if the service to be provided by the service providing device 10 is forming an image based on image data provided by the service requesting device 20, a printing resolution of the image corresponding to a CPU format of the service requesting device 20, which is indicated in the parameter reply, is extracted from the configuration table shown in FIG. 6A. More specifically, when the CPU format indicated in the parameter reply is "2 GHz, manufactured by A Corp.," the resolution 200*200 is extracted based on the configuration table shown in FIG. 6A. Similarly, a resolution of the image corresponding to a RAM volume of the service requesting device 20, which is also indicated in the parameter reply, is extracted from the configuration table shown in FIG. 6B. That is, when the RAM volume indicated in the parameter reply is "128 MB," the resolution 150*150 is extracted based on the configuration table shown in FIG. 6B. Further, between the two resolutions (i.e., 200*200 and 150*150), the smaller value is selected as the service receiving parameter being associated with the parameter reply of the service requesting device.

In S250, confirmation data is transmitted to the service requesting devices 20 which have returned the parameter replies. The confirmation data indicates the service receiving parameter determined as above in S240 and is transmitted to the service requesting devices 20 to confirm that the service requesting device 20 is suitably configured to receive the service with the service receiving parameters. In S250, in addition to the confirmation data, a parameter request, which is similar to the parameter request transmitted in S210, including the identifying flag, the model version, and the manufacture's number of the service providing device 10 is transmitted to the service requesting devices 20.

If the service requesting device 20 receiving the confirmation data is suitably configured to receive the service with the service receiving parameters, the service requesting device 20 configures the parameters as indicated in the service receiving parameters and returns configuration acknowledging data, indicating acknowledgment of the service receiving parameters, to the service providing device 10 (S370 in FIG. 4B, which will be described later). On the other hand, if the service requesting device 20 receiving the confirmation data is not suitably configured to receive the service with the service receiving parameters, the service requesting device 20 returns negative acknowledging data, indicating incapableness of the service receiving parameters and current parameter settings of the service requesting device 20, to the service providing device 10 (S350 in FIG. 4B, which will be described later).

The configuration acknowledging data and the negative acknowledging data respectively indicate, similarly to the parameter reply as shown in FIG. 5, the identifying flag, the model version, and the manufacture's number of the service providing device 10, and the time of transmission. Further, information to indicate the performance of the CPU 212 of the service requesting device 20, the RAM volume of the RAM 216, and the OS version of the service requesting device 20 are included. Furthermore, information of parameters (service receivable parameters, which will be described later), i.e., the printing resolution in the present embodiment, being currently set in the service requesting device 20 is included (see an area indicated by a dotted line in FIG. 5).

Thus, in S260, the service providing device 10 receives one of the configuration acknowledging data and the negative acknowledging data from the service requesting device 20. Thereafter, in S270, it is judged as to whether the received data is the configuration acknowledging data.

In S270, if it is judged that the received data is the negative acknowledging data (S270: NO), in S280, the service receiving parameters determined in S240 are modified based on the service receivable parameters, which are included in the negative acknowledging data. In this regard, the service receivable parameters indicated in the negative acknowledging data are upper limit values for the service receiving parameters.

Following S280, the process proceeds to S250, in which the confirmation data to confirm the capability of the service requesting device 20 with the service receiving parameter modified in S280 is transmitted to the service requesting devices 20. The following steps S260-S270 are performed as described above.

In S270, if it is judged that the received data is the configuration acknowledging data (S270: YES), in S290, the service receiving parameters previously determined in S240 (or modified in S280) are registered in a parameter table stored in the storage unit 122 of the service providing device 10 in association with the service requesting device 20 which has returned the parameter reply. The process thereafter returns to S230.

The parameter table is a data table prepared for each service which can be provided by the service providing device 10. In the parameter table, the service receiving parameters for the service to be used in a service requesting device 20 are registered in association with information to identify the service requesting device 20. If the service requesting device 20 has been registered in the parameter table previously, the service receiving parameters associated with the service requesting device 20 in the parameter table are overwritten by the service receiving parameters determined in S240 and acknowledged through S250 through S270.

Thus, the steps S230 through S290 are repeated for each function parameter included in the parameter replies collected in S220. Thereafter, in S230, it is judged that all of the function parameters included in the parameter replies, collected in S220, are registered in association with service receiving parameters in the parameter table (S230: YES). The parameter setting process terminates thereafter.

It is noted, if no parameter reply is received in S220, in S230, it is also judged that all of the function parameters included in the parameter replies are registered in association with service receiving parameters in the parameter table (S230: YES). The parameter setting process terminates thereafter.

Next, referring to FIG. 4B, the auto-configuration process to be executed by the service requesting device 20 in parallel with the parameter setting process will be described. The auto-configuration process is activated after once the service requesting device 20 is activated at a predetermined interval and upon an operation given to the service requesting device 20 to update the service receiving parameters.

As the auto-configuration process starts, in S310, it is judged as to whether the service requesting device 20 receives the parameter request transmitted from the service providing device 10 (see S210 in FIG. 4A) within a predetermined period of time. The predetermined period of time for the service requesting device 20 to wait for the parameter request is configured to be longer than the predetermined interval of the service providing device 10 to activate the parameter setting process.

In S310, if it is judged that no parameter request is received (S310: NO), the auto-configuration process is terminated. Meanwhile, if it is judged that the parameter request is received (S310: YES), in S320, function parameters of the service requesting device 20 corresponding to the received parameter request are specified. More specifically, function parameters indicating specific values for parameters to be configured in the service requesting device 20 for receiving the service from the service providing device 10, which is the sender of the parameter request, are specified. In the present embodiment, information to indicate the performance of the CPU 212 of the service requesting device 20 (i.e., CPU format), the maximum space of the RAM 216 (RAM volume), and version information of the operating system (OS version) of the service requesting device 20 are included as the function parameters.

In S330, a parameter reply (see FIG. 5) indicating information to notify the function parameters is returned to the service providing device 10, which is the sender of the parameter request being received in S310. As shown in FIG. 5, the parameter reply includes the identifying flag, the model version, and the manufacture's number of the service providing device 10, which were included in the received parameter request, and time of transmission. Further, information to indicate the CPU format of the CPU 212, the RAM volume of the RAM 216, the OS version of the service requesting device 20, and time of transmission.

The parameter reply is thus received by the service providing device 10 (see S220 in FIG. 4A), which transmits the confirmation data (see S240, S250 in FIG. 4A) to the service requesting device 20.

The confirmation data is received in the service requesting device in S340. Thereafter, in S350, it is judged as to whether the service requesting device 20 is not suitably configured to receive the service with the service receiving parameters being indicated in the confirmation data.

In the present embodiment, a service table (not shown), stored in the storage unit 222 of the service requesting device 20, is prepared for each service to receive, and each of the function parameters is associated with service receivable parameters, which indicate parameters for suitably receiving the service, in the service table.

In S350, it is judged as to whether the service requesting device 20 is suitably configured to receive the service from the service providing device 10 based on the service receiving parameters indicated in the confirmation data, which is received in S340. More specifically, one of the service tables stored in the storage unit 222, which corresponds to the service to be provided by the service providing device 10 as the sender of the received parameter request (in S310), is specified. Based on the specified service table, service receivable parameters being associated with the function parameters specified in S320 are determined. The service receivable parameters thus determined are compared with the service receiving parameters indicated in the confirmation data, which is received in S340. When the service receivable parameters indicated in the service table and the service receiving parameters indicated in the confirmation data correspond (coincide within a predetermined error), it is judged that the service requesting device 20 can be suitably configured to receive the service with the service receiving parameters being indicated in the confirmation data. When the service receivable parameters indicated in the service table and the service receiving parameters indicated in the confirmation data do not correspond, it is judged that the service requesting device 20 cannot be suitably configured to receive the service with the service receiving parameters being indicated in the confirmation data.

In addition to the above judgment, when the service table corresponding to the service to be provided by the service providing device 10 does not include the service receivable parameters associated with the function parameters, it is also judged that the service requesting device 20 can be suitably configured to receive the service with the service receiving parameters being indicated in the confirmation data.

In S350, if the negative judgment is made (S350: NO), in S360, negative acknowledging data, indicating incapableness of the service receiving parameters and current parameter settings of the service requesting device 20, is returned to the service providing device 10 (S260 in FIG. 4A). Thereafter, the process returns to S340.

The negative acknowledging data to be transmitted to the service providing device 10 is received by the service providing device 10 (see S260 in FIG. 4A). The negative acknowledging data indicates, similarly to the parameter reply as shown in FIG. 5, the identifying flag, the model version, and the manufacture's number of the service providing device 10, and the time of transmission. Further, information to indicate the performance of the CPU 212 of the service requesting device 20, the RAM volume of the RAM 216, and the OS version of the service requesting device 20 are included. Furthermore, information (i.e., the printing resolution) of the parameters being set in the service requesting device 20 in S350 is included (see an area indicated by a dotted line in FIG. 5).

In S350, on the other hand, if the affirmative judgment is made (S350: YES), in S370, the service receiving parameters indicated in the confirmation data, which is received in S340, are set in the service requesting device 20. In this step of the present embodiment, the service receiving parameters indicated in the confirmation data are registered in the service table. When the service table already includes service receivable parameters for the service to be provided by the service providing device 10, the service receivable parameters already registered in the service table are updated (overwritten) by the service receiving parameters indicated in the confirmation data.

Thereafter, in S380, the service requesting device 20 returns configuration acknowledging data, indicating acknowledgment of the service receiving parameters, to the service providing device 10 (see S160 in FIG. 4A), which is the sender of the parameter request being received in S310. The configuration acknowledging data indicates, similarly to the parameter reply as shown in FIG. 5, the identifying flag, the model version, and the manufacture's number of the service providing device 10, and the time of transmission. Further, information to indicate the performance of the CPU 212 of the service requesting device 20, the RAM volume of the RAM 216, and the OS version of the service requesting device 20 are included. Furthermore, information (i.e., the printing resolution) of the parameters being set in the service requesting device 20 in S370 is included (see an area indicated by a dotted line in FIG. 5).

Thereafter, the auto-configuration process is terminated. The service requesting device 20, in which registration in the service table is completed, being configured with the service receiving parameters, can access the service providing device 10 to receive the service from the service providing device 10.

Figure 7:
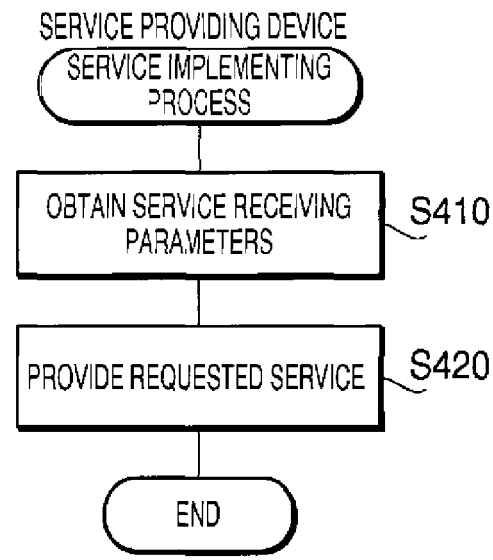
FIG. 7 is a flowchart to illustrate a service implementing process to be executed by the service providing device according to the embodiment of the present invention.

Next, referring to FIG. 7, a service implementing process performed by the service providing device 10 is described. FIG. 7 is a flowchart to illustrate the service implementing process according to the embodiment of the present invention. The service implementing process is performed each time the service providing device 10 is accessed by the service providing device 10 for receiving a service. An access for receiving a service by the service requesting device 20 includes, for example, when providing the service is printing an image based on image data, transmitting image data to be printed and requesting data to print the image based on the image data to the service providing device 10.

When the service implementing process starts, in S410, the service providing device 10 refers to the parameter table for the service being requested and obtains service receiving parameters, which correspond to the accessing service requesting device 20.

In S420, a process to provide the service, requested by the service requesting device 20, is performed according to the service receiving parameters obtained in S410. The service implementing process terminates thereafter.

Figure 8:
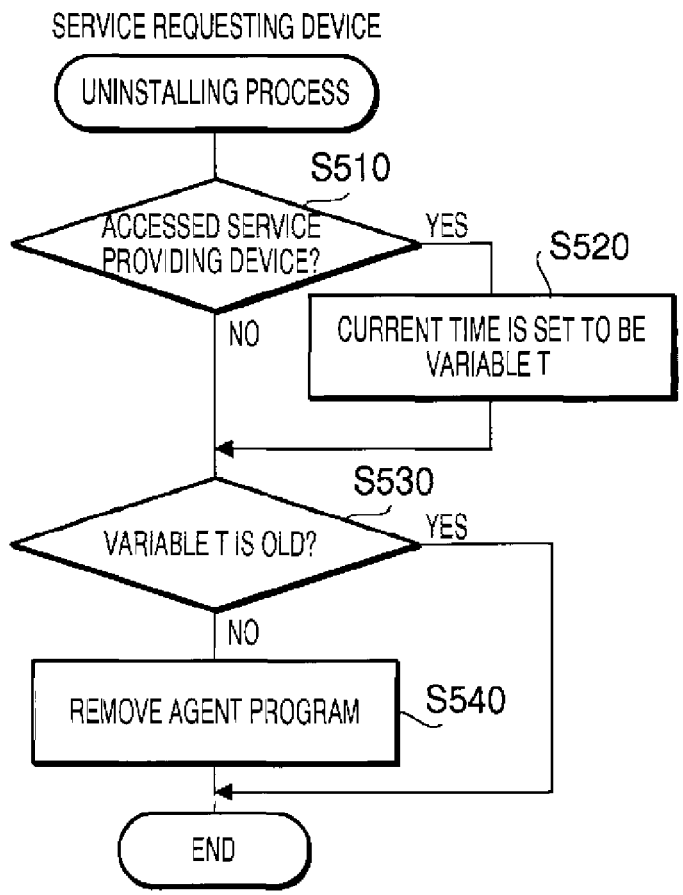
FIG. 8 is a flowchart to illustrate an uninstalling process to be executed by the service requesting device according to the embodiment of the present invention.

Next, referring to FIG. 8, an uninstalling process to be performed by the service requesting device 20 is described. FIG. 8 is a flowchart to illustrate the uninstalling process according to the embodiment of the present invention. The uninstalling process is repeatedly performed at a predetermined interval once the agent program is installed in the service requesting device 20 (see S110 in FIG. 3).

When the uninstalling process starts, in S510, it is judged as to whether the service requesting device 20 has previously accessed the service providing device 10, which corresponds to the agent program installed in the service requesting device 20 in order to receive the service from the service providing device 10, after the uninstalling process terminated (see FIG. 7). In S510, if it is judged that the service requesting device 20 has accessed (S510: YES), in S520, a current time is set to be a variable T. Thereafter, the process proceeds to S530. If it is judged that the service requesting device has not accessed (S510: NO), the process proceeds to S530.

In S530, it is judged as to whether the variable T is equal to or older than a predetermined time (e.g., six months ago). If it is judged that the variable T is equal to or older than the predetermined time (S530: YES), in S540, the agent program previously installed (in S110 in FIG. 3) is uninstalled. Thereafter, the uninstalling process terminates.

Meanwhile, in S530, the variable T is newer than the predetermined time (S530: NO), the uninstalling process terminates without uninstalling the agent program.

As has been described above, in the service providing system 1, the service providing device 10 determines the service receiving parameters to be used in the service requesting device 20 to receive the service based on the function parameters obtained from the service requesting device 20 (see S240 in FIG. 4A), and the determined service receiving parameters are registered in the parameter table (see S290 in FIG. 4A). The service providing device 10 configured as above is accessed by the service requesting device 20, the service providing device 10 provides the service according to the service receiving parameters which correspond to the service requesting device 20 as registered in the parameter table (see S410, S420 in FIG. 7).

It is noted that the service receiving parameters registered in the parameter table are determined based on the function parameters of the service requesting device 20 which indicate specifications and performances of the service requesting device. Therefore, the service can be provided suitably according to the specifications and performances of the service requesting device 20.

In the service providing system according to the present invention, the service can be provided without having the configuration of the service requesting device 20 adjusted. That is, it is not necessary that a user operates the service requesting device 20 in order to receive the service from the service providing device 10. Thus, even an inexperienced user can easily receive the service from the service providing device.

In the above embodiment, the service receiving parameters determined according to the function parameters, which are obtained from the service requesting device 20, can be judged to be unsuitable for the service requesting device 20 (see S350 in FIG. 4B, S270 in FIG. 4A). In such a case, the once determined service receiving parameters can be modified (in S280 in FIG. 4A).

Thus, the service can be provided to the service requesting device 20 with the modified service receiving parameters so that the unsuitable configuration of the service requesting device to receive the service can be avoided.

In the judgment to find the suitability of the once determined service receiving parameters (S350), the service table of the service requesting device 20, in which services receivable in the service requesting device 20 and service receivable parameters for receiving the receivable services are associated, is referred to. Therefore, suitable parameters can be selected among previously prepared service receivable parameters so that a processing time to obtain the suitable service receiving parameters can be shorter than a processing time to calculate suitable service receiving parameters.

Further, in the above embodiment, the service receiving parameters determined by the service providing device 10 (in S240 in FIG. 4A) can be modified suitably based on the service receivable parameters registered in the service table in the service requesting device 20 (S280), and the modified parameters can be registered in the parameter table of the service providing device 10. Therefore, the service receiving parameters suitable to the service requesting device 20 can be registered to suitably provide the service regardless of the performances of the service providing device 10 and specifications of the service to be provided.

It is noted that with the above configuration the same service can be provided by another service providing device, which is different from the service providing device 10, to the service requesting device 20 being configured with the same service receiving parameters.

Furthermore, in the parameter setting process in the above embodiment, the steps S250-S280 (in FIG. 4A) are repeated until the service receiving parameters are suitable for the service requesting device 20 to receive the service so that the once determined service receiving parameters (in S240) can be suitably modified.

In addition, the agent program installed in the service requesting device 20 can be removed by the uninstalling process if the service requesting device 20 has not accessed the service providing device 10 for a predetermined period of time (in S510-S540 in FIG. 8). Thus, usable period of the agent program can be limited, and usage of the agent program can be automatically expired. Therefore, for example, when the service providing device 10 is replaced with a new service providing device, the old agent program is not maintained in the storage unit so that a storage volume for the agent program can be prevented from becoming larger to include the old and the new agent programs. Further, incorrect service receiving parameters based on an unsuitable program can be prevented from being maintained.

Although an example of carrying out the invention have been described, those skilled in the art will appreciate that there are numerous variations and permutations of the service providing system that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the service to be provided by the service providing device 10 is not limited to printing and reading an image, as described in the above embodiment.

For another example, in the above embodiment, single networking devices are configured to be the service providing device 10 and the service requesting device 20 respectively. However, a plurality of networking devices can be configured to serve as a service providing device and as a service requesting device respectively.

Further, in the above embodiment, the service providing device 10 obtains the function parameters of the service requesting device by transmitting the parameter requests to the service requesting devices 20 (in S210 in FIG. 4A), which transmits the function parameters in return (in S330 in FIG. 4B). However, a method to obtain the function parameters of the service requesting devices is not limited. For example, if the service providing device 10 is equipped with a function to detect connection of the service requesting devices 20 to the network 2, the service providing device 10 can request the service requesting devices 20 to notify the function parameters by activating the parameter setting process upon detecting the service requesting devices 20. For another example, the service requesting devices 20 can voluntary notify the function parameters to the service providing device 10 in a predetermined timing (e.g., at a predetermined or upon a predetermine event). In this regard, the parameter setting process can be activated when the parameter replies from the service requesting devices 20 are received and terminated following the steps S240-S290 in FIG. 4A.

Furthermore, in S350 in FIG. 4B, the judgment to determine the once determined service receiving parameters are suitable for receiving the service is not limited as long as the judgment is made according to a condition of the service requesting device 20. For example, the judgment can be made based on the capability of the service requesting device 20 to receive the service with the once determined service receiving parameters. For another example, the service table in the service requesting device 20 can be configured such that each receivable service for the service requesting device 20 and service receivable parameters therefor are associated. With reference to such a service table, in S350 in FIG. 4B, the service requesting device 20 can compare the service receiving parameters indicated in the confirmation data with the service receivable parameters associated with the receivable service as indicated in the service table.

In addition, for example, in S280 in FIG. 4A, upon modification of the once determined service receiving parameters, the service receivable parameters indicated in the negative acknowledging data being set in the service requesting device 20 are the upper limit values for the service receiving parameters. However, the once determined service receiving parameters can be modified by adding or subtracting predetermined values so that the modified service receiving parameters can be larger or smaller at fixed amounts than the once determined service receiving parameters.

Further, in S240 in FIG. 4A, the service receiving parameters for the function parameters of the service requesting device 20 are determined with reference to the configuration table, in which the function parameters and the service receiving parameters are associated with each other. However, the service receiving parameters can be calculated based on the function parameters indicated in each parameter reply from the service requesting device 20 and according to a predetermined formula.

Figure 9:
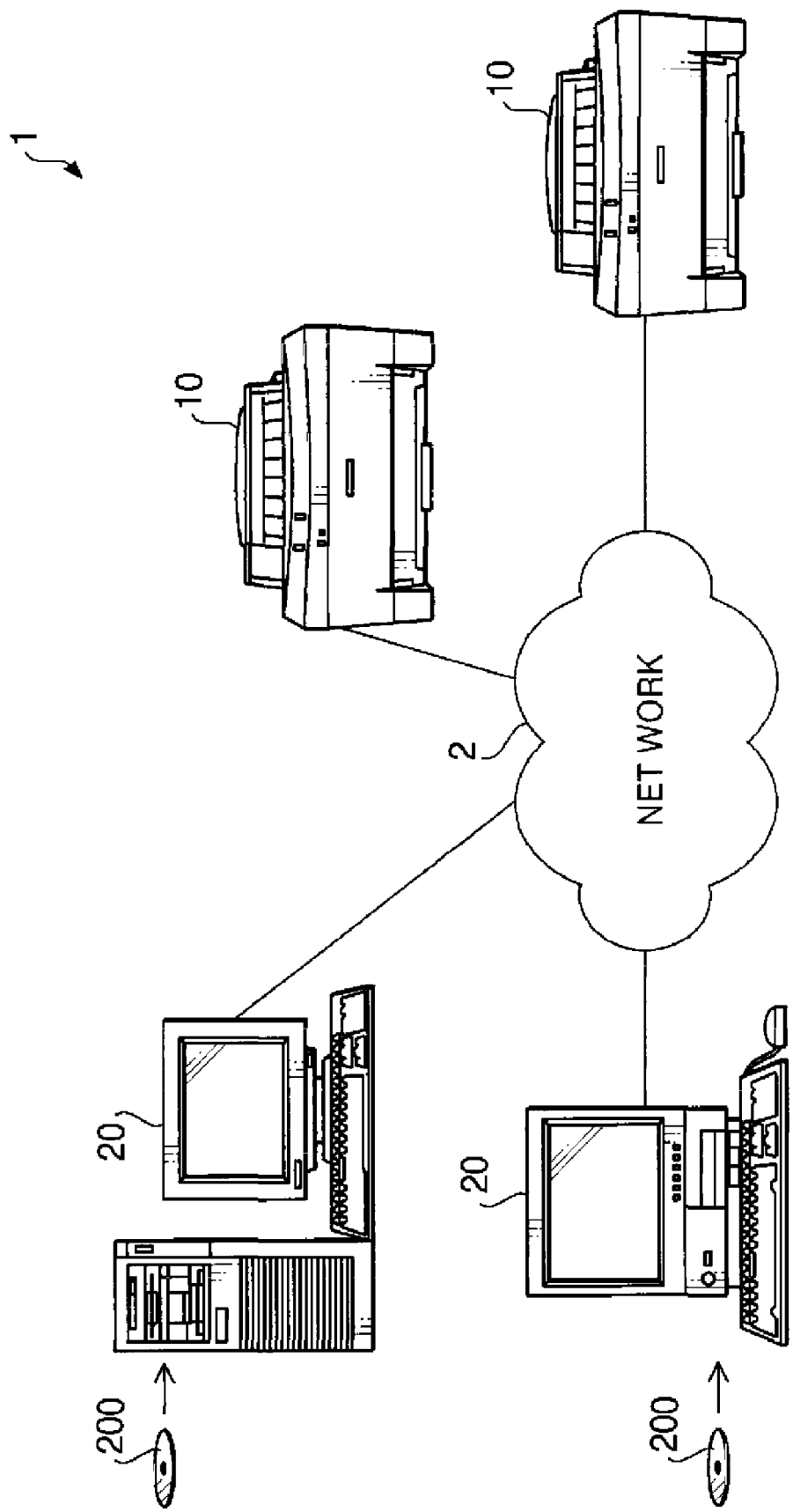
FIG. 9 is a schematic illustration of an entire configuration of a service providing system according to another embodiment of the present invention.

Furthermore, the service providing system 1 as described above can be configured with a plurality of service providing devices 10. FIG. 9 is a schematic illustration of an entire configuration of such a service providing system according to the present invention. In this configuration, the service providing devices 10 should be identified by, for example, the identifying flags so that the service requesting devices 20 can communicate with a desired service providing device 10 in the network 2 based on the identification. In this regard, each service providing device 10 is configured to register the service receiving parameters corresponding to each service requesting device 20.

In the above configuration, the service receiving parameters are registered in each service providing device 10 according to the function parameters of each service requesting device 20. Therefore, the service providing devices 10 can provide the services according to the respectively registered service receiving parameters regardless of the specifications and capabilities of each service requesting device 20.

What is claimed is:

1. A method to configure a service providing system having a service providing device and a service requesting device which are connected with each other within a network such that the service requesting device is allowed to receive a data processing service from the service providing device, comprising steps of:

obtaining function parameters, which indicate specific values in the service requesting device for receiving the data processing service, from the service requesting device when the service requesting device becomes connected to communicate with the service providing device;

determining service receiving parameters, which indicate parameters to enable the service requesting device to receive the data processing service;

configuring the service requesting device with the service receiving parameters determined in the service receiving parameter determining step;

registering the service receiving parameters in association with the service requesting device;

implementing the data processing service for the service requesting device based on the service receiving parameters, which are associated with the service requesting device, when the service requesting device accesses the service providing device;

judging whether the service receiving parameters determined in the service receiving parameters determining step allow for the service requesting device to receive the data processing service based on a condition of the service requesting device; and modifying the service receiving parameters when the service receiving parameters are judged in the judging step to not allow the service requesting device to receive the data processing service, wherein the registering step includes registering the service receiving parameters in association with the service requesting device when the service receiving parameters are judged in the judging step to allow for the service requesting device to receive the data processing service, and registering the modified service receiving parameters, modified in the modifying step, in association with the service requesting device when the service receiving parameters are judged in the judging step to not allow for the service requesting device to receive the data processing service, wherein the judging step includes examining the modified service receiving parameters, modified in the service receiving parameters modifying step, to judge whether the modified service receiving parameters allow for the service requesting device to receive the data processing service when the service receiving parameters are modified, and wherein the previously modified service receiving parameters are repeatedly modified when the modified service receiving parameters are judged in the judging step to not allow the service requesting device to receive the data processing service.

2. The method according to claim 1, further comprising a step of:

storing each of the function parameters in the service requesting device in association with a service receivable parameter, the service receivable parameter indicating a predetermined parameter for the service requesting device to receive the data processing service, wherein the judging step includes determining the service receivable parameters for the service requesting device according to the association between the function parameter and the service receivable parameter in the service requesting device, comparing the determined service receivable parameters with the service receiving parameters determined in service receiving parameters determining step, and judging the service receiving parameters determined in the service receiving parameters determining step allow for the service requesting device to receive the data processing service when the service receiving parameters correspond to the service receivable parameters.

3. The method according to claim 2, wherein the service receivable parameters for the service requesting device, determined in the judging step according to the association between the function parameter and the service receivable parameter in the service requesting device, are upper limit values for the service receiving parameters when the service receiving parameters are modified in the service receiving parameters modifying step.

4. The method according to claim 1, further comprising a step of:

storing each of the service receiving parameters in the service providing device in association with the function parameters, wherein the service receiving parameters determining step includes determining the service receiving parameters for the service requesting device with reference to the association between the function parameters obtained in the function parameters obtaining step and the service receiving parameter.

5. A service providing system, comprising:

a service providing device, configured to be connected to a network such that the service providing device is accessible to another device and configured to provide a data processing service to another device within the network;

a service requesting device, configured to communicate with the service providing device through the network and configured to access the service providing device to obtain the data processing service, wherein the service providing device includes:

a function parameter obtaining system configured to obtain function parameters, which indicate specific values in the service requesting device for receiving the data processing service, from the service requesting device when the service requesting device becomes connected to communicate with the service providing device;

a parameter determining system configured to determine service receiving parameters, which indicate parameters to enable the service requesting device to receive the data processing service;

a parameter registering system configured to register the service receiving parameters in association with the service requesting device when the service receiving parameters determined in the parameter determining system are determined to be accepted by the service requesting device; and a service implementation system configured to implement the data processing service for the service requesting device based on the service receiving parameters, which are associated with the service requesting device, when the service requesting device accesses the service providing device; and a judging system configured to judge whether the service receiving parameters determined by the parameter determining system allow for the service requesting device to receive the data processing service based on a condition of the service requesting device, wherein the service providing device further includes a parameter modifying system configured to modify the service receiving parameters when the judging system judges that the service receiving parameters determined by the parameter determining system do not allow the service requesting device to receive the data processing service, wherein the parameter registering system of the service providing device registers the service receiving parameters in association with the service requesting device when the judging system judges that the service receiving parameters determined by the parameter determining system allow the service requesting device to receive the data processing service, wherein the parameter registering system of the service providing device registers the modified service receiving parameters, modified by the parameter modifying system, in association with the service requesting device when the judging system judges that the service receiving parameters determined by the parameter determining system do not allow for the service requesting device to receive the data processing service, wherein the judging system examines the modified service receiving parameters, modified by the parameter modifying system in order to judge whether the modified service receiving parameters allow the service requesting device to receive the data processing service when the parameter modifying system modifies the service receiving parameters, and wherein the parameter modifying system repeatedly modifies the previously modified service receiving parameters when the judging system judges that the modified service receiving parameters do not allow for the service requesting device to receive the data processing service.

6. The service providing system according to claim 5, wherein each of the function parameters is stored in association with a service receivable parameter in the service requesting device, the service receivable parameter indicating a predetermined parameter for the service requesting device to receive the data processing service; and wherein the judging system determines the service receivable parameters for the service requesting device according to the association between the function parameter and the service receivable parameter in the service requesting device, compares the determined service receivable parameters with the service receiving parameters determined by the parameter determining system, and judges the service receiving parameters determined by the parameter determining system allow for the service requesting device to receive the data processing service when the service receiving parameters correspond to the service receivable parameters.

7. The service providing system according to claim 6, wherein the service receivable parameters for the service requesting device, determined by the judging system according to the association between the function parameter and the service receivable parameter in the service requesting device, are upper limit values for the service receiving parameters when the service receiving parameters are modified by the parameter modifying system.

8. The service providing system according to claim 5, wherein each of the service receiving parameters is stored in the service providing device in association with the function parameters; and wherein the parameter determining system determines the service receiving parameters for the service requesting device with reference to the association between the function parameters obtained by the function parameter obtaining system and the service receiving parameter.

9. A service providing device, which is connected to a network such that the service providing device is accessible to another device and configured to provide a data processing service to a service requesting device in the network, comprising:

a function parameter obtaining system configured to obtain function parameters, which indicate specific values in the service requesting device for receiving the data processing service, from the service requesting device when the service requesting device becomes connected to communicate with the service providing device;

a parameter determining system configured to determine service receiving parameters, which indicate parameters to enable the service requesting device to receive the data processing service;

a parameter registering system configured to register the service receiving parameters in association with the service requesting device when the service receiving parameters determined in the parameter determining system are determined to be accepted by the service requesting device;

a service implementation system configured to implement the data processing service for the service requesting device based on the service receiving parameters, which are associated with the service requesting device, when the service requesting device accesses the service providing device; and a parameter modifying system configured to modify the service receiving parameters when the service receiving parameters determined by the parameter determining system do not allow the service requesting device to receive the data processing service, wherein the parameter modifying system repeatedly modifies the previously modified service receiving parameters when the modified service receiving parameters do not allow the service requesting device to receive the data processing service.

10. A non-transitory computer readable medium storing computer readable instructions that when executed by a processor, configure a service providing system having a service providing device and a service requesting device which are connected with each other within a network such that the service requesting device is allowed to receive a data processing service from the service providing device, by executing steps of:

obtaining function parameters, which indicate specific values in the service requesting device for receiving the data processing service, from the service requesting device when the service requesting device becomes connected to communicate with the service providing device;

determining service receiving parameters, which indicate parameters enabling the service requesting device to receive the data processing service; configuring the service requesting device with the service receiving parameters determined in the service receiving parameter determining step;

registering the service receiving parameters in association with the service requesting device;

implementing the data processing service for the service requesting device based on the service receiving parameters, which are associated with the service requesting device, when the service requesting device accesses the service providing device;

judging whether the service receiving parameters determined in the service receiving parameters determining step allow for the service requesting device to receive the data processing service based on a condition of the service requesting device;

modifying the service receiving parameters when the service receiving parameters are judged in the judging step to not allow the service requesting device to receive the data processing service, wherein the registering step includes registering the service receiving parameters in association with the service requesting device when the service receiving parameters judged in the judging step do not allow for the service requesting device to receive the data processing service, and registering the modified service receiving parameters, modified in the modifying step, in association with the service requesting device when the service receiving parameters judged in the judging step do not allow for the service requesting device to receive the data processing service, wherein the judging step includes examining the modified service receiving parameters, modified in the service receiving parameters modifying step, judging whether the modified service receiving parameters allow the service requesting device to receive the data processing service when the service receiving parameters are modified, and repeatedly modifying the previously modified service receiving parameters when the modified service receiving parameters judged in the judging step do not allow for the service requesting device to receive the data processing service.

11. The non-transitory computer readable medium according to claim 10, further comprising computer readable instructions to configure the service providing system by further executing steps of:

storing each of the function parameters in the service requesting device in association with a service receivable parameter, the service receivable parameter indicating a predetermined parameter for the service requesting device to receive the data processing service, wherein the judging step includes determining the service receivable parameters for the service requesting device according to the association between the function parameter and the service receivable parameter in the service requesting device, comparing the determined service receivable parameters with the service receiving parameters determined in service receiving parameters determining step, and judging whether the service receiving parameters determined in the service receiving parameters determining step allow for the service requesting device to receive the data processing service when the service receiving parameters correspond to the service receivable parameters.

12. The non-transitory computer readable medium according to claim 11, wherein the service receivable parameters for the service requesting device, determined in the judging step according to the association between the function parameter and the service receivable parameter in the service requesting device, are upper limit values for the service receiving parameters when the service receiving parameters are modified in the service receiving parameters modifying step.

13. The non-transitory computer readable medium according to claim 10, further comprising computer readable instructions to configure the service providing system by further executing steps of:

storing each of the service receiving parameters in the service providing device in association with the function parameters, wherein the service receiving parameters determining step includes determining the service receiving parameters for the service requesting device with reference to the association between the function parameters obtained in the function parameters obtaining step and the service receiving parameter.

* * * * *